United States Patent
Bowar et al.

(10) Patent No.: US 9,522,443 B2
(45) Date of Patent: Dec. 20, 2016

(54) CONNECTION REPLACEMENT FOR A DRILLING MUD MOTOR

(71) Applicant: HUNTING ENERGY SERVICES, INC., Houston, TX (US)

(72) Inventors: David A. Bowar, Casper, WY (US); Tyler J. Batt, Casper, WY (US); William Michael Webber, Navasota, TX (US)

(73) Assignee: Hunting Energy Services, Inc., Houston, TX (US)

( * ) Notice: Subject to any disclaimer, the term of this patent is extended or adjusted under 35 U.S.C. 154(b) by 0 days.

(21) Appl. No.: 14/697,808

(22) Filed: Apr. 28, 2015

(65) Prior Publication Data

US 2016/0318131 A1   Nov. 3, 2016

(51) Int. Cl.
| | |
|---|---|
| *B23K 9/00* | (2006.01) |
| *E21B 10/00* | (2006.01) |
| *B23K 31/02* | (2006.01) |
| *E21B 4/02* | (2006.01) |
| *E21B 10/02* | (2006.01) |

(52) U.S. Cl.
CPC ............... *B23K 31/02* (2013.01); *E21B 4/02* (2013.01); *E21B 10/00* (2013.01); *E21B 10/02* (2013.01); *B23B 2215/68* (2013.01); *B23K 2201/002* (2013.01)

(58) Field of Classification Search
CPC ..................... B23B 2215/68; B23B 2260/078; E21B 10/00; E21B 10/02; B23G 1/22; B23G 7/00; B23K 2201/002
USPC ........................... 228/101, 150; 175/375, 435
See application file for complete search history.

(56) References Cited

U.S. PATENT DOCUMENTS

| | | | |
|---|---|---|---|
| 3,181,398 A | 5/1965 | Rogers | |
| 4,121,486 A | 10/1978 | Frank | |
| 4,420,865 A | 12/1983 | Haygood | |
| 6,199,462 B1 | 3/2001 | Hallett | |
| 8,784,161 B1 | 7/2014 | Burleson et al. | |
| 8,925,431 B2 | 1/2015 | Manwaring | |
| 2008/0017420 A1* | 1/2008 | Law ..................... | E21B 17/076 |
| | | | 175/321 |
| 2009/0032310 A1 | 2/2009 | Stevens et al. | |
| 2013/0160611 A1* | 6/2013 | Matthews, III ......... | E21B 10/00 |
| | | | 76/108.2 |

OTHER PUBLICATIONS

Trinity Holdings website re: Protective Coatings, Rotary Connections, Joining of Rotors and Downhole Tools; www.trinityholdings.com; 4 pages.

* cited by examiner

*Primary Examiner* — Erin Saad
(74) *Attorney, Agent, or Firm* — Whitaker Chalk Swindle & Schwartz PLLC; Charles D. Gunter, Jr.

(57) ABSTRACT

A method for reconditioning a rotary connection of a rotor on a drilling mud rotor. A new rotary connection is machined from a metal blank and is provided with an externally threaded pin end which is subsequently screwed into a mating female threaded opening provided on the rotor body. The new metal connection is welded to the rotor body at an intersection of the connection and selected end of the rotor body. The threaded end of the new connection is threaded a predetermined depth which is selected to bottom out at a selected depth within the mating female threaded opening provided on the rotor body prior to the welding step.

3 Claims, 5 Drawing Sheets

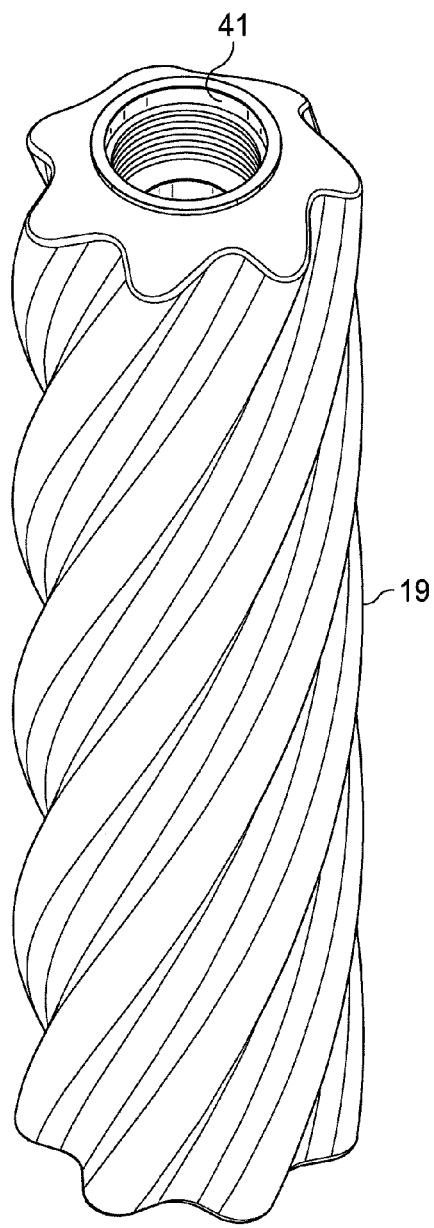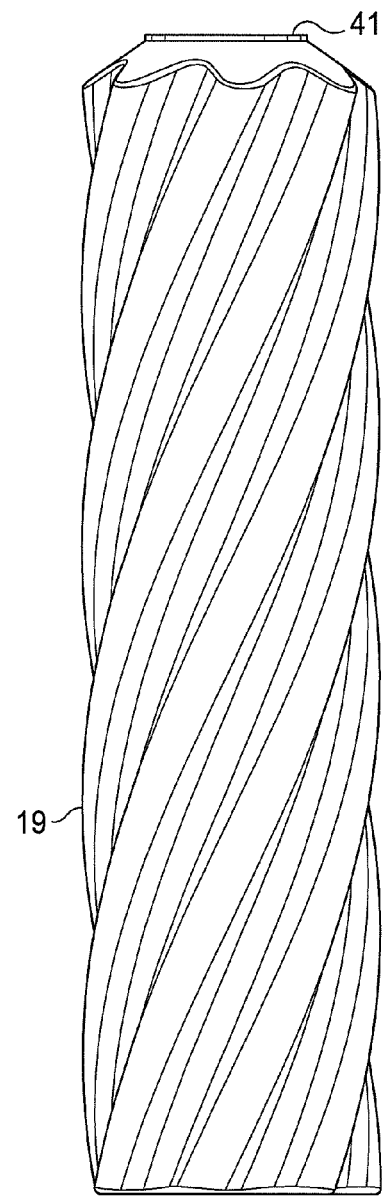
FIG. 5
FIG. 6

CONNECTION REPLACEMENT FOR A DRILLING MUD MOTOR

BACKGROUND OF THE INVENTION

1. Field of the Invention

The present invention relates generally to a method for repairing components of a mud motor of the type used in the earth drilling industries and, more specifically, to a method of repairing a worn rotary connection of a rotor using a stub welding technique.

2. Description of the Prior Art

Mud motors are used for various drilling tasks such straight hole, horizontal and directional oilfield drilling, river crossings and other utility drilling. They are connected to the drill string to rotate and steer the drill bit. Rotation is provided by a power section, which is typically a positive displacement motor that is driven by drilling fluid circulation. Axial and radial drilling loads are directed to the drill string by the bearings within the bearing assembly.

In a typical horizontal drilling application, surface pumps are used to circulate the drilling fluid to flush rock cuttings to the surface for disposal. The drilling fluid flows down through the bore of the drill string, exiting into the annulus of the well through the jets in the drill bit. The cuttings are flushed up the annulus of the well by the returning drilling fluid. The annulus pressure is substantially lower than the drill string bore pressure due to the pressure drop that occurs as the drilling fluid passes through the drill bit jets.

The typical mud motor is a progressive cavity positive displacement pump (PCPD). As mentioned, the PCPD pump uses drilling fluid to create eccentric motion in the power section of the motor which is transferred as concentric power to the drill bit. Based on the principle developed by Rene Moineau, the theory states that a helical rotor with one or more lobes will rotate eccentrically when the stator contains more lobes than the rotor. The mud motor uses different rotor and stator configurations to provide optimum performance for the desired drilling operation. In certain applications, compressed air, or other gas, can be used for mud motor input power.

Normal mud motor construction consists of a top sub, which connects the mud motor to the drill string; the power section, which consists of the rotor and stator; the transmission section, where the eccentric power from the rotor is transmitted as concentric power to the bit; the bearing assembly which protects the tool from off bottom and on bottom pressures; and the bottom sub which connects the mud motor to the bit.

A mud motor is usually described in terms of its number of stages, lobe ratio and external diameter. Stages are the number of full twists that the stator makes from one end to the other and the lobe ratio is the number of lobes on the stator, to the number of lobes on the rotor (the stator always has one more lobe than the rotor). The operating parameters include flow rate, bit rpm and torque. The relationship between the rotor and the stator geometry determines the rotational speed and torque. The rotational speed is proportional to the flow rate and torque is proportional to the pressure drop in the fluid as it flows through the motor. These principles will be familiar to those skilled in the relevant arts.

Hunting Energy Services, Houston, Tex., and Casper, Wyo., is a leader in progressive-cavity, positive displacement mud motors. Typical sizes range from 1¹¹⁄₁₆" to 9⅝", for various applications, be it coil tubing or large hole applications. These include both straight hole and directional applications. Power sections are available in a wide range of speeds.

There are various conditions in which the internal components of the mud motor can be damaged in use. For example, when the bit is bottomed and the motor is effectively working, there is a notable increase in the pressure in the fluid system. This is caused by a restriction within the motor. If the differential pressure is too high then the motor can stall which means the bit has stopped turning and this can cause severe damage to the internal surface of the stator. Another particular problem deals with the "rotary connection" at one end of the rotor which is used to connect the rotor body to the mating internal components of the motor. Sometimes, either due to normal use or misuse, the rotary connection can be damaged so that it needs to be replaced.

The existing "stub welding" techniques used in the industry to repair or replace damaged rotary connections do not work adequately. When using, for example, a 17-4 stainless steel material, it is not generally possible to get the rotary connection back to an acceptable mechanical condition. As a result, it may not be possible to return the motor to service for multiple trips or uses.

As a result, a need exists for a technique for reconditioning the rotor of a drilling mud motor, which technique preferably uses an improved stub welding technique to repair the rotary connection of the rotor.

SUMMARY OF THE INVENTION

A method is shown for reconditioning a rotary connection on a drilling mud motor where the drilling mud motor has a power section including a rotor body and a stator. Simply stated, a new rotary connection is provided which is made from a generally cylindrical, solid blank of metal. The new metal connection is provided with an externally threaded end which is subsequently screwed into a mating female threaded opening provided on a selected end of the rotor body. The new metal connection is then welded to the rotor body at an intersection of the connection and selected end of the rotor body. The threaded end of the new connection is threaded a predetermined depth which is selected to bottom out at a selected depth within the mating female threaded opening provided on the rotor body prior to the welding step.

The preferred method of the invention is used to recondition a rotor of a drilling mud motor where the rotor has a worn or damaged rotary connection at one end thereof. The drilling mud motor typically has a top sub which connects the mud motor to a drill string, a power section which is made up of the rotor and a stator, a transmission section where eccentric power from the rotor is transmitted as concentric power to a drill bit, a bearing assembly which protects the drilling mud motor from off bottom and on bottom pressures, and a bottom sub which connects the drilling mud motor to the bit. The preferred method comprises the steps of:

removing the worn or damaged rotary connection which is present on a selected end of the rotor;

provided a new rotary connection which is machined from a generally cylindrical, solid blank of metal;

machining an externally threaded pin end connection on a selected end of the solid blank of metal;

machining or repairing a mating female threaded opening provided on a selected end of the rotor body, the female internally threaded opening comprising an internal bore which terminates at an internal end surface;

screwing the pin end of the rotary connection into the mating female internally threaded opening on the rotor body;

wherein the externally threaded pin end of the new connection is threaded a predetermined depth which is selected to contact the internal end surface of the female, internally threaded opening and bottom out at a selected depth; and the new metal rotary connection then being welded to the rotor body at an intersection of the connection and selected end of the rotor body.

Additional objects, features and advantages will be apparent in the written description which follows.

BRIEF DESCRIPTION OF THE DRAWINGS

FIGS. 5 and 6 are a perspective and side view, respectively, of the reconditioned rotor, showing the female internally threaded end of the rotor which receives the pin end of the machined blank of FIG. 4.

DETAILED DESCRIPTION OF THE INVENTION

The preferred version of the invention presented in the following written description and the various features and advantageous details thereof are explained more fully with reference to the non-limiting examples and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
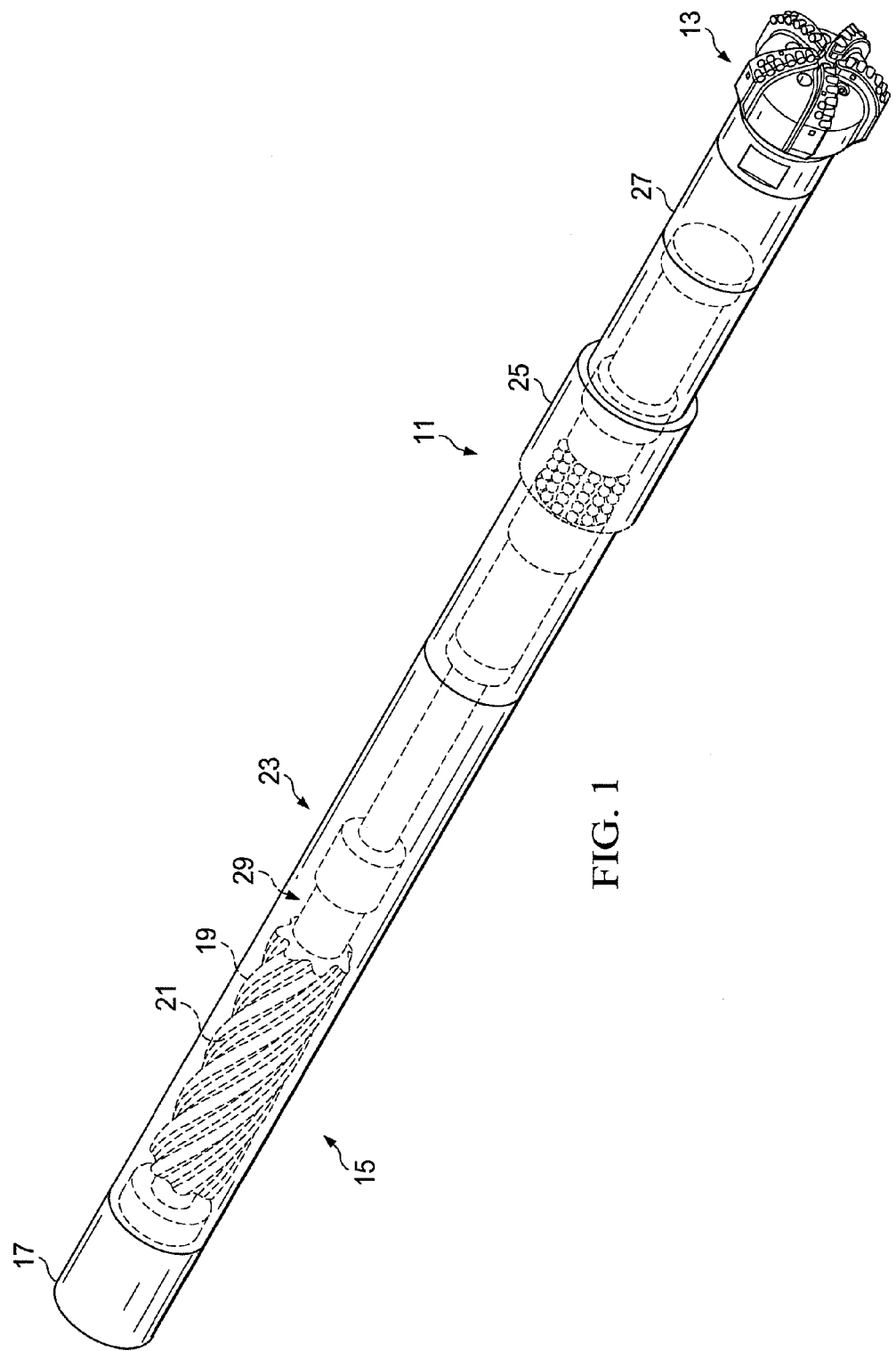
FIG. 1 is a simplified perspective view of a drilling mud motor of the type which is the subject of the present invention with certain internal components being shown in broken lines.

Turning first to FIG. 1, there is shown a drilling mud motor, designated generally as 11, of the type which is the subject of the method of the invention. There are many varieties of such tools in use in the drilling industries today, and FIG. 1 is merely intended to be generally illustrative thereof and to assist in defining the general environment of the invention. As explained briefly in the Background discussion, mud motors of this general type are used for various drilling tasks such straight hole, horizontal and directional oilfield drilling, river crossings and other utility drilling. They are connected to the drill string (not shown) to rotate and steer the drill bit 13. As will be familiar to those skilled in the relevant arts, the typical mud motor of the type under consideration has a top sub (17 in FIG. 1) which connects the mud motor to the drill string, a power section (generally at 15 which is made up of the rotor 19 and a stator 21), a transmission section (generally at 23) where eccentric power from the rotor is transmitted as concentric power to the drill bit, a bearing assembly (generally at 25) which protects the drilling mud motor from off bottom and on bottom pressures, and the bottom sub (generally at 27) which connects the drilling mud motor to the bit. Rotation is provided by the power section, which is typically a positive displacement motor that is driven by drilling fluid circulation. Axial and radial drilling loads are directed to the drill string by the bearings within the bearing assembly.

In a typical drilling application, surface pumps are used to circulate the drilling fluid to flush rock cuttings to the surface for disposal. The drilling fluid flows down through the bore of the drill string, exiting into the annulus of the well through the jets in the drill bit. The cuttings are flushed up the annulus of the well by the returning drilling fluid. The annulus pressure is substantially lower than the drill string bore pressure due to the pressure drop that occurs as the drilling fluid passes through the drill bit jets.

Figure 9:
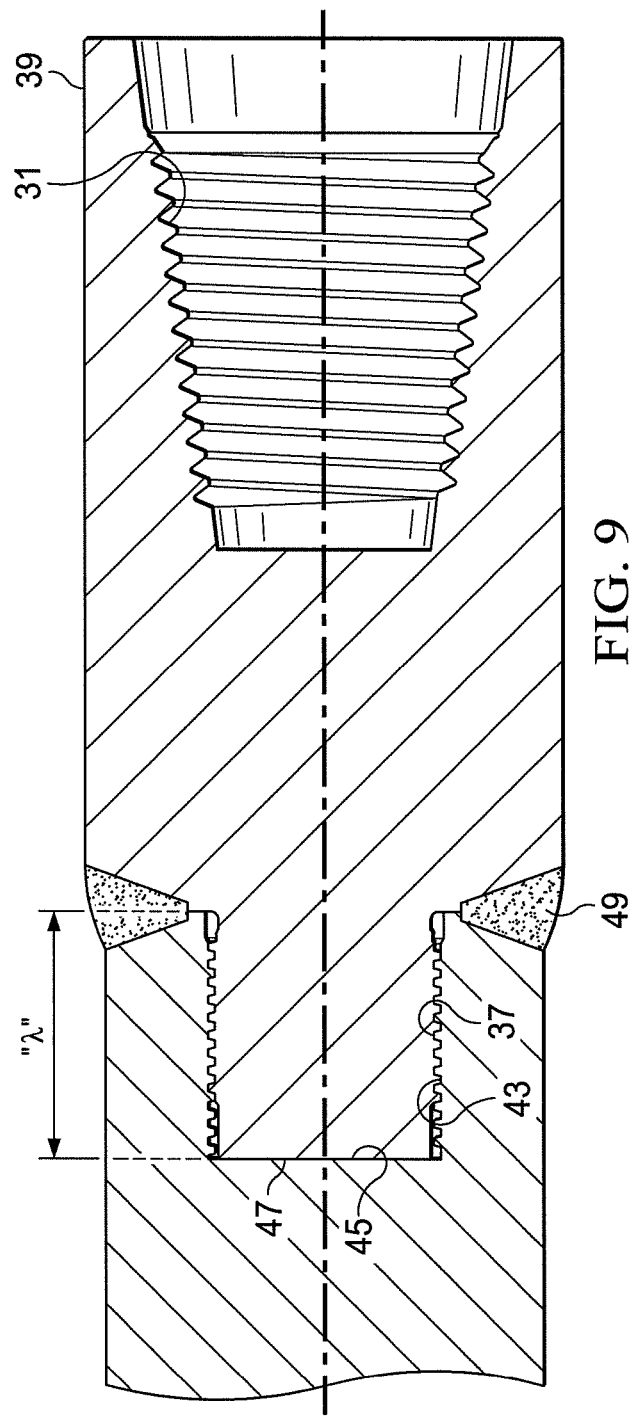
FIG. 9 is a side, partial cross sectional view of the new rotary connection shown after assembly with the reconditioned rotor.

As also briefly discussed, various conditions cause wear and damage to the components of the mud motor assembly. One of the components of interest is the "rotary connection" (29 in FIG. 1) located at one end of the rotor 19. The rotary connection 29 has an internally threaded female bore (31 in FIG. 9) which is used to connect the rotor to the mating internal components of the motor. The internal bore will typically be provided with, but not limited to, either a REG or NC thread, as will be familiar to those skilled in the relevant industry. However, the connection is not limited to these particular kinds of connections.

Prior practice in the industry was to cut off the old rotary connection and bore a straight hole in the end of the rotor. A straight pin end was then machined on a new blank. The straight pin end was inserted into the straight hole in the rotor and the two were welded at their intersection. Most briefly stated, in the method of the invention, the old connection is cut off. A new connection is machined from a metal blank with a threaded pin end, for example with an acme thread. A mating threaded bore is machined into the rotor end with a mating thread. The pin end of the new blank is then screwed into the female bore of the rotor until the pin end bottoms out. The blank and rotor are then welded, as in the prior art practice.

Figure 2:
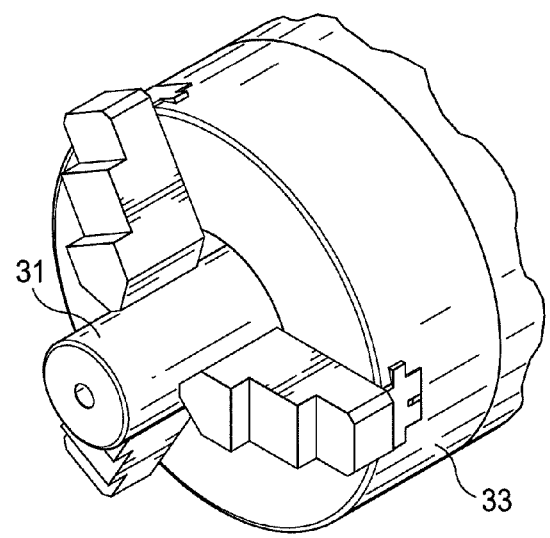
FIG. 2 is a perspective view of a portion of a metal blank which is used to make the new rotary connection using the method of the invention, the blank being shown positioned in the cutting element of a machine tool.
Figure 3:
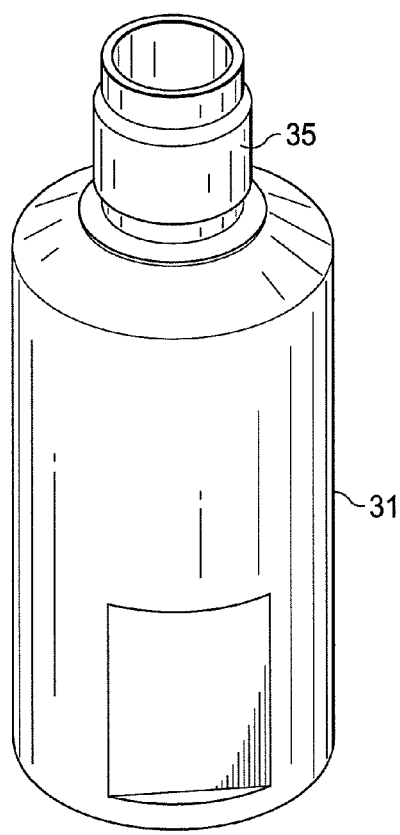
FIG. 3 shows the beginning machining step used in making the new rotary connection of the invention in which the pin end is partly formed.
Figure 4:
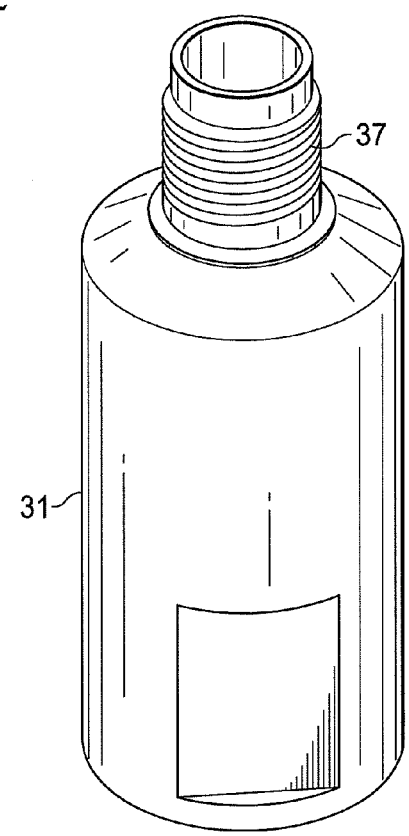
FIG. 4 shows the continuation of the machining of the pin end of the new rotary connection.

The method of the invention will now be described in greater detail. The method is used for repairing or reconditioning a rotor with a worn or damaged rotary connection. As a preliminary step, the existing worn or damaged rotary connection on the rotor 19 is first removed. This can be accomplished by cutting off the old rotary connection. A new connection is then provided using the method of the invention which is made from a generally cylindrical, solid blank of metal (illustrated as 31 in FIG. 2), such as, for example, a 17-4 stainless steel. The blank 31 in FIG. 2 is shown positioned in the cutting element 33 of a conventional machine tool, such as a lathe. The machine tool is used to form a new externally threaded, pin end (shown partly completed as 35 in FIG. 3 and fully completed in FIG. 4). As previously mentioned, the opposite end (39 in FIG. 9) of the blank is provided with a conventional internally threaded surface 31 which can be, but not limited to, either a conventional REG or NC thread. This end of the blank will be used to connect the rotor to the mating internal components of the motor.

As illustrated in FIGS. 5 and 6, another step in the method of the invention is to machine a mating female internally threaded opening (shown as 41 in FIGS. 5 and 6) provided on a selected end of the rotor body. The female internally threaded opening 41 comprises an internal bore (43 in FIG. 9) which terminates at an internal end surface 45.

Figure 7:
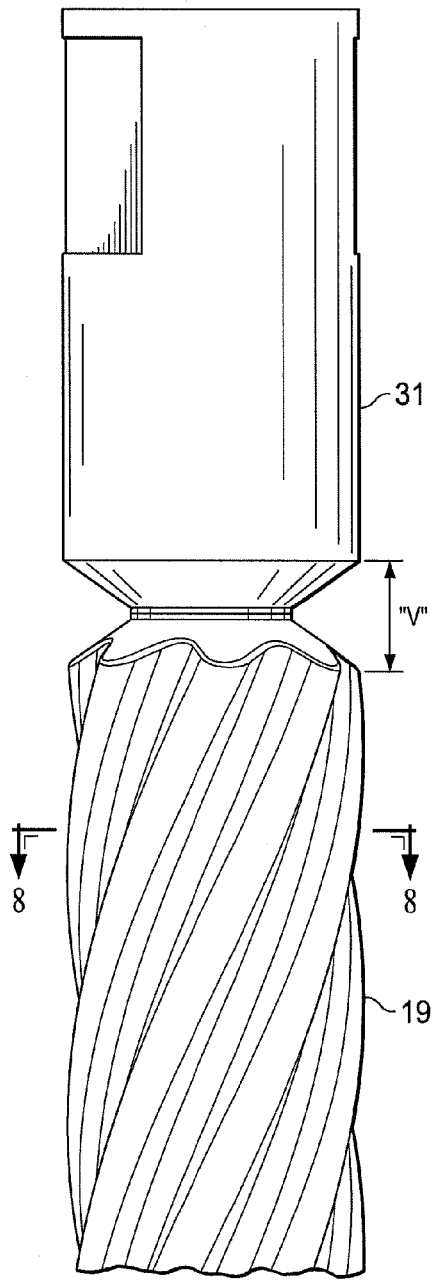
FIG. 7 shows the assembly of the externally threaded pin end of the machined blank with the internally threaded bore of the female end opening of the rotor.
Figure 8:
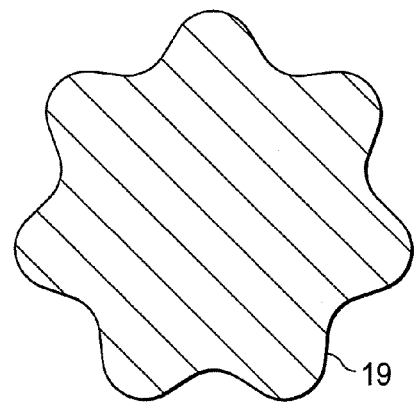
FIG. 8 is a cross sectional view of the rotor of FIG. 7, taken along lines VII-VII in FIG. 7.

In the next step in the method, the pin end 37 of the rotary connection is screwed into the mating female internally threaded bore 43 on the rotor body. FIG. 7 shows the new connection 31 matingly engaged within the mating threaded bore of the rotor 19, prior to welding.

A critical aspect of the improved method of the invention is the face that the externally threaded pin end 37 of the new connection is threaded a predetermined length (illustrated as "1" in FIG. 9) which extends to the full depth of the mating bore 43 of the rotor, so that the pin outer face 47 contacts and "bottoms out" against the internal end surface 45 of the female, internally threaded bore 43.

As can be seen in FIG. 7, the opposing ends of the new connection 31 and the rotor 19 meet at a "V-shaped" region ("V" in FIG. 7). In the next step in the method, the new metal rotary connection is then welded to the rotor body at an intersection of the connection and selected end of the rotor body. The weld region is illustrated as 49 in FIG. 9.

An invention has been provided with several advantages. The method of the invention allows for the replacement of connections to rotors used in, for example, oilfield drilling mud motors, bringing the rotors back to a near new condition. This increases the useful life expectancy of the product maximizing the product utilization. The new process includes removing the old connection and replacing it with a new connection using a threaded blank that is screwed into the old rotor body and welded in place. To add stability to the connection, the threaded blank is bottomed out into the rotor body prior to welding. This results in the weld being used only for holding the blank in place and not relying on the weld as the only means of support.

While the invention has been shown in several of its forms, it is not thus limited but is susceptible to various changes and modifications without departing from the spirit thereof.

What is claimed is:

1. A method for reconditioning a rotor of a drilling mud motor where the rotor has a worn or damaged rotary connection at one end thereof, the drilling mud motor having a top sub which connects the mud motor to a drill string, a power section which is made up of the rotor and a stator, a transmission section where eccentric power from the rotor is transmitted as concentric power to a drill bit, a bearing assembly which protects the chilling mud motor from of bottom and on bottom pressures, and the bottom sub which connects the drilling mud motor to the bit, the method comprising the steps of:

removing the worn or damaged rotary connection which is present on a selected end of the rotor;

provided a new rotary connection which is machined from a generally cylindrical, solid blank of metal;

machining an externally threaded pin end connection on a selected end of the solid blank of metal;

machining a mating female threaded opening on a selected end of the rotor body, the female internally threaded opening comprising an internal bore which terminates at an internal end surface;

screwing the pin end of the rotary connection into the mating female internally threaded opening on the rotor body;

wherein the externally threaded pin end of the new connection is threaded a predetermined depth which is selected to contact the internal end surface of the female, internally threaded opening and bottom out at a selected depth; and the new metal rotary connection then being welded to the rotor body at an intersection of the connection and selected end of the rotor body.

2. The method of claim 1, wherein the new connection has a connecting end, opposite the threaded end which is provided with an internally threaded bore.

3. The method of claim 2, wherein the internally threaded bore provided on the opposite threaded end of the new connection is provided with a REG or NC connecting thread.

* * * * *